(12) United States Patent
Saguchi

(10) Patent No.: US 11,876,186 B2
(45) Date of Patent: Jan. 16, 2024

(54) ALKALINE STORAGE BATTERY AND METHOD FOR MANUFACTURING THE ALKALINE STORAGE BATTERY

(71) Applicant: FDK CORPORATION, Tokyo (JP)

(72) Inventor: Akira Saguchi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 12 days.

(21) Appl. No.: 17/158,711

(22) Filed: Jan. 26, 2021

(65) Prior Publication Data

US 2021/0257674 A1 Aug. 19, 2021

(30) Foreign Application Priority Data

Feb. 17, 2020 (JP) ................................. 2020-024565

(51) Int. Cl.
*H01M 10/28* (2006.01)
*H01M 4/04* (2006.01)
(Continued)

(52) U.S. Cl.
CPC ....... *H01M 10/286* (2013.01); *H01M 4/0404* (2013.01); *H01M 10/0422* (2013.01);
(Continued)

(58) Field of Classification Search
CPC .... Y02E 60/10; Y02P 70/50; H01M 10/0431; H01M 10/0422; H01M 10/286;
(Continued)

(56) References Cited

U.S. PATENT DOCUMENTS

2005/0031944 A1* 2/2005 Sodemann ............. H02J 1/001
429/153
2005/0031949 A1 2/2005 Maeda
(Continued)

FOREIGN PATENT DOCUMENTS

JP 2001266899 A * 9/2001 ............. Y02E 60/10
JP 2006032304 A * 2/2006 ............. Y02P 70/50
(Continued)

OTHER PUBLICATIONS

Machine translation of specification of JP2001266899A (Year: 2001).*
(Continued)

*Primary Examiner* — Christopher P Domone
(74) *Attorney, Agent, or Firm* — Kinney & Lange, P.A.

(57) ABSTRACT

An alkaline storage battery includes a spiral electrode group in which a positive electrode plate, a negative electrode plate, and a separator arranged between the positive electrode plate and the negative electrode plate are laminated, the negative electrode plate is located on the inner peripheral side of the positive electrode plate at an innermost peripheral portion, and an electrically conductive outer packaging can in which the spiral electrode group is accommodated together with an alkaline electrolytic solution. The negative electrode plate includes a negative electrode core body, a first negative electrode mixture layer carried on a surface on the outer peripheral side of the negative electrode core body, and a second negative electrode mixture layer carried on a surface on the inner peripheral side of the negative electrode core body. The negative electrode core body has a burr protruding toward the outer peripheral side at an edge portion of an innermost peripheral portion of the negative electrode core body. The thickness of the edge portion of an innermost peripheral portion of the first negative electrode mixture layer is smaller than the thickness of a portion other (Continued)

than the edge portion of the first negative electrode mixture layer. The height of the burr is 30% or less of the thickness of the separator.

6 Claims, 5 Drawing Sheets

(51) Int. Cl.
*H01M 50/107* (2021.01)
*H01M 10/04* (2006.01)
*H01M 50/131* (2021.01)
*H01M 4/02* (2006.01)

(52) U.S. Cl.
CPC ....... *H01M 10/288* (2013.01); *H01M 50/107* (2021.01); *H01M 50/131* (2021.01); *H01M 2004/021* (2013.01)

(58) Field of Classification Search
CPC ............. H01M 10/288; H01M 4/0404; H01M 50/107; H01M 50/131; H01M 2004/021; H01M 10/24; H01M 10/0409; H01M 10/0587; H01M 10/125; H01M 4/24; Y02T 10/70
See application file for complete search history.

(56) References Cited

U.S. PATENT DOCUMENTS

| 2005/0031950 | A1 | | 2/2005 | Maeda | |
|---|---|---|---|---|---|
| 2005/0095505 | A1 | | 5/2005 | Ohata et al. | |
| 2007/0072072 | A1 | * | 3/2007 | Maeda | H01M 50/423 |
| | | | | | 429/130 |
| 2011/0014509 | A1 | * | 1/2011 | Kim | H01M 10/0431 |
| | | | | | 429/94 |

FOREIGN PATENT DOCUMENTS

| JP | 2014170664 A | | 9/2014 | |
|---|---|---|---|---|
| JP | 2015103498 A | * | 6/2015 | ............. Y02E 60/10 |

OTHER PUBLICATIONS

Machine translation of specification of JP2015103498A (Year: 2015).*
Machine translation of JP-2006032304-A (Year: 2006).*
Extended European Search Report dated May 27, 2021, received for corresponding European Application No. 21156069.3, 7 pages.

* cited by examiner

ALKALINE STORAGE BATTERY AND METHOD FOR MANUFACTURING THE ALKALINE STORAGE BATTERY

CROSS-REFERENCE TO RELATED APPLICATION(S)

This application claims priority to Japanese Application No. 2020-024565 filed on Feb. 17, 2020, which is incorporated by reference in its entirety.

BACKGROUND

Technical Field

The present disclosure relates to an alkaline storage battery and a method for manufacturing the alkaline storage battery.

Description of Related Art

An alkaline storage battery includes an electrode body in which a positive electrode plate, a negative electrode plate, and a separator are laminated. In the electrode body, the separator is arranged between the positive electrode plate and the negative electrode plate. In the alkaline storage battery, for example, the electrode body is wound in a spiral shape, and accommodated together with an alkaline electrolytic solution in a cylindrical outer packaging can having electric conductivity. In the alkaline storage battery, a predetermined electrochemical reaction occurs between the positive electrode plate and the negative electrode plate which face each other via the separator, whereby charging and discharging are performed.

For example, a battery described in Japanese Patent Laid-Open No. 2014-170664 includes an electrode body having a belt-shaped positive electrode plate and a belt-shaped negative electrode plate, and a separator interposed therebetween. The electrode body is shaped to be spirally wound around a Z-axis and flattened in an X-axis direction. Specifically, in the electrode body described in Japanese Patent Laid-Open No. 2014-170664, an outer separator formed of two layers and an inner separator formed of one layer are interposed between an end portion of the positive electrode plate and the negative electrode plate facing the end portion of the positive electrode plate in a winding center region of the electrode body. Therefore, the battery described in Japanese Patent Laid-Open No. 2014-170664 is designed to prevent a short circuit between the positive electrode plate and the negative electrode plate by the separator formed of three layers even when burrs are formed on the end portion of the positive electrode plate of the electrode body so as to face the negative electrode plate side.

As described above, in the battery described in Japanese Patent Laid-Open No. 2014-170664, the separator to be arranged between the end portion of the positive electrode plate and the negative electrode plate is formed of three layers to increase the thickness of the separator, thereby avoiding the burrs of the positive electrode plate from penetrating the separator and reaching the negative electrode plate. However, in the battery described in Japanese Patent Laid-Open No. 2014-170664, when the burrs of the positive electrode plate are formed to be higher than the thickness of the separator, the burrs may penetrate the separator and cause a short circuit between the positive electrode plate and the negative electrode plate.

SUMMARY

According to the present disclosure, an alkaline storage battery comprises: a spiral electrode group that is spirally formed by laminating a belt-shaped positive electrode plate, a belt-shaped negative electrode plate, and a belt-shaped separator arranged between the positive electrode plate and the negative electrode plate, and is formed so that the negative electrode plate is located on an inner peripheral side of the positive electrode plate at an innermost peripheral portion of the spiral electrode group; and an outer packaging can having electric conductivity in which the spiral electrode group is accommodated together with an alkaline electrolytic solution, wherein the negative electrode plate includes a belt-shaped negative electrode core body, a first negative electrode mixture layer carried on a surface on an outer peripheral side of the negative electrode core body, and a second negative electrode mixture layer carried on a surface on an inner peripheral side of the negative electrode core body, the negative electrode core body has a burr protruding toward an outer peripheral side at an edge portion of an innermost peripheral portion of the negative electrode core body, a thickness of the edge portion of the innermost peripheral portion of the first negative electrode mixture layer is smaller than a thickness of a portion other than the edge portion of the first negative electrode mixture layer, and a height of the burr is 30% or less of a thickness of the separator.

According to the present disclosure, a method for manufacturing the alkaline storage battery, comprises: a coating step of coating a first negative electrode mixture layer onto one surface of a belt-shaped negative electrode core body base material having a longitudinal direction and a short direction, and coating a second negative electrode mixture layer onto the other surface of the negative electrode core body base material; a cutting step of cutting, after the coating step, the negative electrode core body base material, the first negative electrode mixture layer, and the second negative electrode mixture layer in the longitudinal direction at a center in the short direction of the negative electrode core body base material, and cutting in the short direction of the negative electrode core body base material to produce a belt-shaped negative plate; a winding step of laminating, after the cutting step, the negative electrode plate, a belt-shaped positive electrode plate, and a belt-shaped separator arranged between the positive electrode plate and the negative electrode plate to form a spiral electrode group having a spiral shape, the spiral electrode group being formed so that the negative electrode plate is located on an inner peripheral side of the positive electrode plate at an innermost peripheral portion of the spiral electrode group; and an insertion step of inserting, after the winding step, the spiral electrode group into an outer packaging can having electrical conductivity together with an alkaline electrolyte solution, wherein an adjustment step is provided after the coating step and before the cutting step, and the first negative electrode mixture layer is adjusted in the adjustment step so that a thickness of the first negative electrode mixture layer in a first region containing the center of the negative electrode core body base material is smaller than a thickness of the first negative electrode mixture layer in a second region other than the first region, and in the winding step, the spiral electrode group is produced so that the first negative electrode mixture layer is located on an outer peripheral side of the negative electrode plate, and the center of the negative electrode core body base material cut in the cutting step becomes an edge of an innermost peripheral portion of the negative electrode plate.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein.

DETAILED DESCRIPTION

An embodiment of a nickel-metal hydride secondary battery 2 (hereinafter, also simply referred to as "battery 2") will be described as an example of an alkaline storage battery that embodies the present disclosure. A case where the present disclosure is applied to a cylindrical battery 2 of an AA size will be described as the present embodiment, but the size of the battery 2 is not limited to this size, and other sizes such as AAA size may be used. Further, any battery may be used as the alkaline storage battery as long as it uses an alkaline solution as an electrolytic solution, and for example, it may be a nickel cadmium storage battery or the like.

Figure 1:
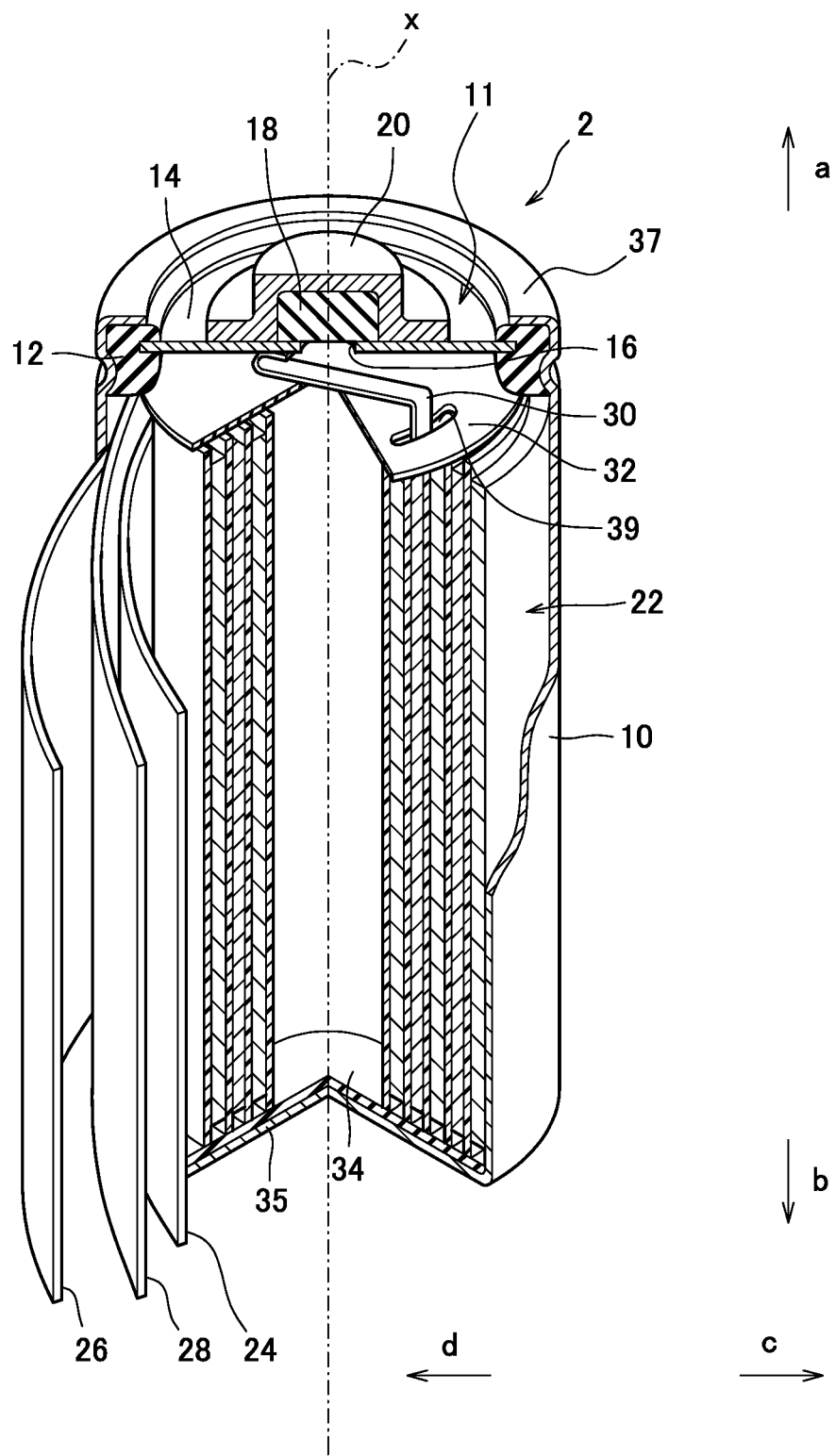
FIG. 1 is a perspective view showing an alkaline storage battery according to an embodiment which is partially broken.
Figure 2:
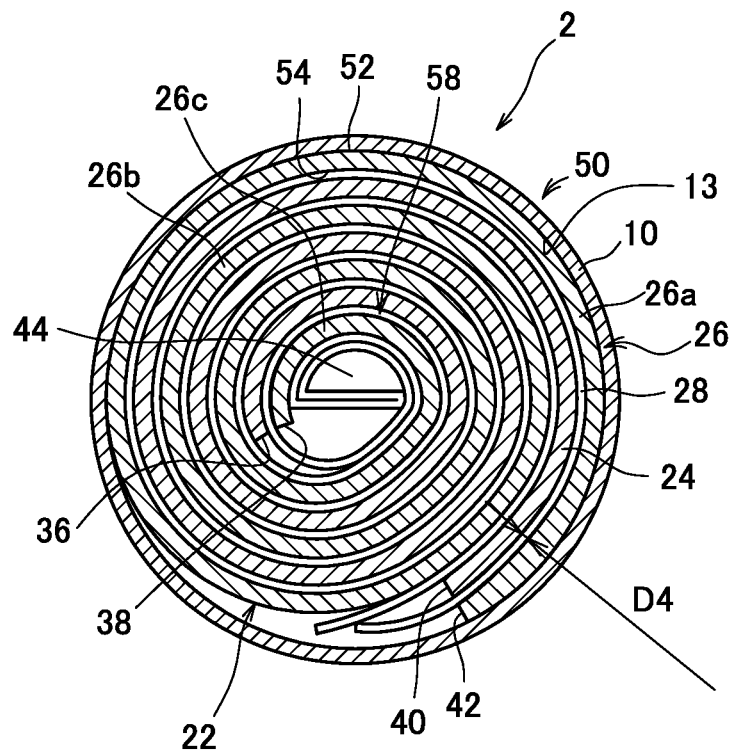
FIG. 2 is a cross-sectional view showing a state in which a spiral electrode group of the alkaline storage battery according to the embodiment is inserted in an outer packaging can.
Figure 3:
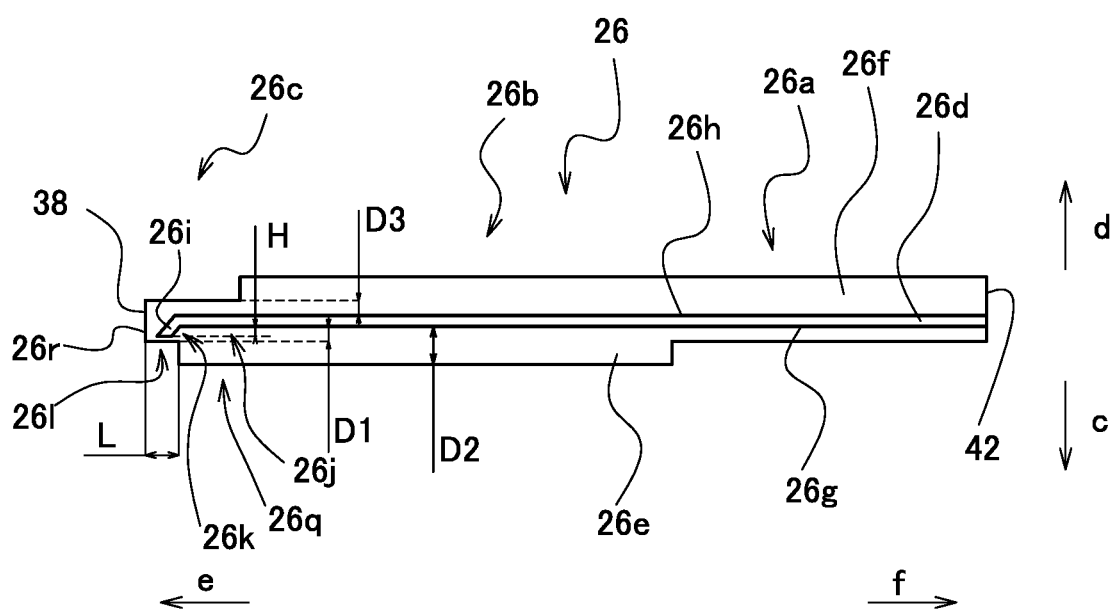
FIG. 3 is an elevational view showing a negative electrode plate of the alkaline storage battery according to the embodiment.

FIG. 1 is a perspective view showing a partially broken nickel-metal hydride secondary battery 2 (alkaline storage battery) according to an embodiment. FIG. 2 is a diagram showing a state in which a spiral electrode group 22 of the nickel-metal hydride secondary battery 2 according to the embodiment is inserted in an outer packaging can 10. FIG. 3 is an elevational view showing a negative electrode plate 26 of the nickel-metal hydride secondary battery 2 according to the embodiment. For convenience of description, an arrow a indicates the direction to an upper side, and an arrow b indicates the direction to a lower side with respect to an axial line x of the cylindrical outer packaging can 10. Here, the upper side means a side of the battery 2 on which a positive electrode terminal 20 is provided, and the lower side means a side of the battery 2 on which a bottom wall 35 is provided and means the side opposite to the upper side. Further, with respect to a direction perpendicular to the axial line x (hereinafter, also referred to as "radial direction"), a direction away from the axial line x is defined as an outer peripheral side direction (the direction of an arrow c), and a direction approaching the axis x is defined as an inner peripheral side direction (the direction of an arrow d).

As shown in FIG. 1, the battery 2 includes the outer packaging can 10 having a cylindrical shape which has a bottom and is opened on the upper side thereof (in the direction of the arrow a). The outer packaging can 10 has electric conductivity, and the bottom wall 35 provided on the lower side (the direction of the arrow b) functions as a negative electrode terminal. A sealing body 11 is fixed to the opening of the outer packaging can 10. The sealing body 11 includes a lid plate 14 and the positive electrode terminal 20, and seals the outer packaging can 10. The lid plate 14 is a disk-shaped member having electric conductivity. The lid plate 14 and a ring-shaped insulating packing 12 surrounding the lid plate 14 are arranged in the opening of the outer packaging can 10, and the insulating packing 12 is fixed to an opening edge 37 of the outer packaging can 10 by caulking the opening edge 37 of the outer packaging can 10. In other words, the lid plate 14 and the insulating packing 12 cooperate with each other to airtightly close the opening of the outer packaging can 10.

Here, the lid plate 14 has a central through-hole 16 in the center thereof, and a rubber valve body 18 that blocks the central through-hole 16 is arranged on an outer surface which is a surface on the upper side of the lid plate 14. Further, the metal positive electrode terminal 20 having a flanged cylinder shape is electrically connected onto the outer surface of the lid plate 14 so as to cover the valve body 18. The positive electrode terminal 20 presses the valve body 18 against the lid plate 14. The positive electrode terminal 20 has a gas vent hole (not shown) formed therein.

Normally, the central through-hole 16 is airtightly closed by the valve body 18. On the other hand, when gas occurs in the outer packaging can 10 and the pressure of the gas increases, the valve body 18 is compressed by the pressure of the gas and the central through-hole 16 is opened, so that the gas is discharged from the inside of the outer packaging can 10 through the central through-hole 16 and the gas vent hole (not shown) of the positive electrode terminal 20 to the outside. In other words, the central through-hole 16, the valve body 18, and the positive electrode terminal 20 form a safety valve for the battery 2.

As shown in FIGS. 1 and 2, the spiral electrode group 22 is accommodated in the outer packaging can 10. The spiral electrode group 22 is formed by laminating the belt-shaped positive electrode plate 24, the belt-shaped negative electrode plate 26, and the belt-shaped separator 28. The spiral electrode group 22 is formed in a spiral shape so that the negative electrode plate 26 is located on the outer peripheral side (the direction of the arrow c) of the positive electrode plate 24 at an outermost peripheral portion 50 of the spiral electrode group 22 and the negative electrode plate 26 is located on the inner peripheral side (the direction of the arrow d) of the positive electrode plate 24 at an innermost peripheral portion 58 of the spiral electrode group 22 in a state where the separator 28 is interposed between the positive electrode plate 24 and the negative electrode plate 26. In other words, the positive electrode plate 24 and the negative electrode plate 26 are laminated on each other via the separator 28.

The spiral electrode group 22 is formed by spirally winding the positive electrode plate 24 and the negative electrode plate 26 from a winding start end 36 of the positive electrode plate 24 and a winding start end 38 of the negative electrode plate 26 with a winding core (not shown) while interposing the separator 28 between the positive electrode plate 24 and the negative electrode plate 26. The winding start end 38 of the negative electrode plate 26 may be flush with the winding start end 36 of the positive electrode plate 24 (FIG. 2), or may protrude in the circumferential direction beyond the winding start end 36 of the positive electrode plate 24 (not shown). Further, winding ends 40 and 42 of the positive electrode plate 24 and the negative electrode plate 26 are positioned at the outermost peripheral portion 50 of the spiral electrode group 22. The winding end 42 of the negative electrode plate 26 may be flush with the winding end 40 of the positive electrode plate 24 (FIG. 2), or may protrude in the circumferential direction beyond the winding end 40 of the positive electrode plate 24 (not shown).

At the outermost peripheral portion 50 of the spiral electrode group 22, an outer surface 52 which is a surface on the outer peripheral side of the negative electrode plate 26 remains exposed without being covered by the separator 28. This outer surface 52 and the inner peripheral wall 13 of the outer packaging can 10 come into contact with each other, whereby the negative electrode plate 26 and the outer packaging can 10 are electrically connected to each other. Further, at the outermost peripheral portion 50 of the spiral electrode group 22, an inner surface 54 which is a surface on the inner peripheral side of the negative electrode plate 26 faces the positive electrode plate 24 via the separator 28. In other words, the negative electrode plate 26 at the outermost peripheral portion 50 of the spiral electrode group 22 faces the positive electrode plate 24 via only the inner surface 54 thereof.

The negative electrode plate 26 has a main body portion 26b which is provided on an inner peripheral side of the outermost peripheral portion 26a of the negative electrode plate 26 so as to extend continuously from the outermost peripheral portion 26a. The negative electrode plate 26 has an innermost peripheral portion 26c which is provided on a further inner peripheral side of the main body portion 26b so as to extend continuously from the main body portion 26b. The main body portion 26b is a portion at which both the outer and inner surfaces 52 and 54 of the negative electrode plate 26 face the positive electrode plate 24 via the separator 28. At the innermost peripheral portion 26c of the negative electrode plate 26, the outer surface 52 of the negative electrode plate 26 faces the positive electrode plate 24 via the separator 28, and the inner surface 54 of the negative electrode plate 26 does not face the positive electrode plate 24. Note that the winding core is pulled out after the winding, so that a space 44 profiling the shape of the winding core exists in the central portion of the spiral electrode group 22.

A positive electrode lead 30 is arranged between the upper end portion of the spiral electrode group 22 and the lid plate 14 inside the outer packaging can 10. Specifically, one end of the positive electrode lead 30 is connected to the positive electrode plate 24, and the other end thereof is connected to the lid plate 14. Therefore, the positive electrode terminal 20 and the positive electrode plate 24 are electrically connected to each other via the positive electrode lead 30 and the lid plate 14. Note that a circular upper insulating member 32 is arranged between the lid plate 14 and the spiral electrode group 22, and the positive electrode lead 30 extends through a slit 39 provided in the upper insulating member 32. Further, a circular lower insulating member 34 is also arranged between the spiral electrode group 22 and the bottom wall 35 of the outer packaging can 10.

Further, a predetermined amount of alkaline electrolytic solution (not shown) is injected into the outer packaging can 10. This alkaline electrolytic solution is impregnated in the spiral electrode group 22, and causes an electrochemical reaction (charge/discharge reaction) under charging/discharging between the positive electrode plate 24 and the negative electrode plate 26. An aqueous solution containing at least one of KOH, NaOH and LiOH as a solute is preferably used as the alkaline electrolytic solution. Further, the concentration of the alkaline electrolytic solution is not particularly limited, and for example, a concentration of 8N (normality) can be used.

As the material of the separator 28, for example, a polyamide fiber non-woven fabric, a polyolefin fiber non-woven fabric such as polyethylene or polypropylene to which a hydrophilic functional group is added, or the like may be used.

The positive electrode plate 24 includes an electrically conductive positive electrode substrate having a porous structure, and a positive electrode mixture held in pores of the positive electrode substrate. For example, a nickel-plated net-like, sponge-like or fibrous metal body can be used as such a positive electrode substrate. The positive electrode mixture contains positive electrode active material particles, an electrically conductive agent and a binder. Further, a positive electrode additive is added to the positive electrode mixture as needed.

Nickel hydroxide particles generally used for a nickel-metal hydride secondary battery are used as the positive electrode active material particles. Higher-order nickel hydroxide particles are preferably adopted as the nickel hydroxide particles. The positive electrode active material particles as described above are manufactured by a manufacturing method generally used for nickel-metal hydride secondary batteries.

As the electrically conductive agent, for example, one or more components selected from cobalt compounds such as cobalt oxide (CoO) and cobalt hydroxide $(Co(OH)_2)$ and cobalt (Co) may be used. This electrically conductive agent is added to the positive electrode mixture as needed, and it may be included in the positive electrode mixture in the form of powder or coating covering the surface of the positive electrode active material.

The binder of the positive electrode mixture has a function of binding the positive electrode active material particles to one other and binding the positive electrode active material particles to the positive electrode substrate. Here, as the binder, for example, carboxymethyl cellulose, methyl cellulose, PTFE (polytetrafluoroethylene) dispersion, HPC (hydroxypropyl cellulose) dispersion and the like may be used. Examples of the positive electrode additive include zinc oxide, cobalt hydroxide, etc.

The positive electrode plate 24 may be manufactured, for example, as follows. First, a positive electrode mixture slurry containing positive electrode active material particles, water, an electrically conductive agent and a binder is prepared. The positive electrode mixture slurry is filled in, for example, a sponge-like nickel metal body and dried. After drying, the metal body filled with nickel hydroxide particles and the like is rolled and then cut to manufacture the positive electrode plate 24.

Next, the negative electrode plate 26 will be described with reference to FIG. 3. For convenience of description, in FIG. 3, a left direction with respect to the paper surface is directed to the winding start end 38 of the negative electrode plate 26 (the direction of an arrow e), and a right direction is directed to the winding end 42 of the negative electrode plate 26 (the direction of an arrow f). Further, a lower side of a negative electrode core body 26d described later is directed to the outer peripheral side in the state of the spiral electrode group 22 (the direction of arrow c), and an upper side of the negative electrode core body 26d described later is directed to the inner peripheral side in the state of the spiral electrode group 22 (the direction of the arrow d).

The negative electrode plate 26 includes an electrically conductive metal negative electrode core body 26d, and a negative electrode mixture layer containing a negative electrode active material (a first negative electrode mixture layer 26e, a second negative electrode mixture) carried on the negative electrode core body 26d, and is formed in a belt-like shape as a whole. Specifically, as shown in FIG. 3, the negative electrode plate 26 includes the belt-shaped negative electrode core body 26d, the first negative electrode mixture layer 26e carried on an outer peripheral surface 26g which is a surface on the outer peripheral side (the direction of the arrow c) of the negative electrode core body 26d, and the second negative electrode mixture layer 26f carried on an inner peripheral surface 26h which is a surface on the inner peripheral side (the direction of the arrow d) of the negative electrode core body 26d. Further, the negative electrode core body 26d has a burr 26i that protrudes toward the outer peripheral side (the direction of the arrow c) at an edge portion 26k of an innermost peripheral portion 26j of the negative electrode core body 26d. Specifically, the burr 26i of the negative electrode core body 26d is formed on the edge portion of the innermost peripheral portion 26c of the negative electrode plate 26, that is, on the winding start end 38 side of the negative electrode plate 26 (the direction of the arrow e).

The thickness D1 of an edge portion 26l of an innermost peripheral portion 26q of the first negative electrode mixture layer 26e is smaller than the thickness D2 of the portion other than the edge portion 26l of the first negative electrode mixture layer 26e, and the height H of the burr 26i is 30% or less of the thickness D4 (FIG. 2) of the separator 28. Specifically, the edge portion 26l of the innermost peripheral portion 26q of the first negative electrode mixture layer 26e is a region contained in the innermost peripheral portion 26c of the negative electrode plate 26, and also a region covering the burr 26i. Here, it is preferable that the thickness D1 of the edge portion 26l of the first negative electrode mixture layer 26e has a thickness of 0.19 mm or less, more specifically a thickness of not less than 0.13 mm and not more than 0.19 mm in a state before the negative electrode plate 26 has been formed in a spiral shape. Further, it is preferable that the edge portion 26l of the first negative electrode mixture layer 26e is located at a distance L of not less than 0.6 mm and not more than 10 mm from an edge 26r of the innermost peripheral portion 26q of the first negative electrode mixture layer 26e in a state before the negative electrode plate 26 has been formed in a spiral shape. The edge 26r of the first negative electrode mixture layer 26e is a portion contained in the winding start end 38 of the negative electrode plate 26.

The negative electrode core body 26d is a belt-shaped metal material having through-holes (not shown) distributed therein, and for example, a punching metal sheet can be used for the negative electrode core body 26d. The negative electrode mixture layer (the first negative electrode mixture layer 26e and the second negative electrode mixture layer 26f) is formed of a negative electrode mixture containing a negative electrode active material. The negative electrode mixture is not only filled in the through-holes of the negative electrode core body 26d, but also is carried, in the form of a layer, on the outer peripheral surface 26g and inner peripheral surface 26h of the negative electrode core body 26d to form a negative electrode mixture layer (a first negative electrode mixture layer 26e and a second negative electrode mixture layer 26f). The negative electrode mixture includes hydrogen storage alloy particles capable of storing and releasing hydrogen as the negative electrode active material, a conductive agent, a binder, and a negative electrode auxiliary agent.

The above-mentioned binder has a function of binding the hydrogen storage alloy particles, the conductive agent and the like to one other, and additionally, binding the hydrogen storage alloy particles, the conductive agent and the like to the negative electrode core body 26d. Here, the binder is not particularly limited, and for example, a binder generally used for a nickel-metal hydride secondary battery such as hydrophilic or hydrophobic polymer or carboxymethyl cellulose may be used. Further, styrene-butadiene rubber, sodium polyacrylate or the like may be used as the negative electrode auxiliary agent. The hydrogen storage alloy in the hydrogen storage alloy particles is not particularly limited, and a material which is used in a general nickel-metal hydride secondary battery is preferable used. A conductive agent generally used for a negative electrode of a nickel-metal hydride secondary battery is used. For example, carbon black or the like is used.

Figure 4:
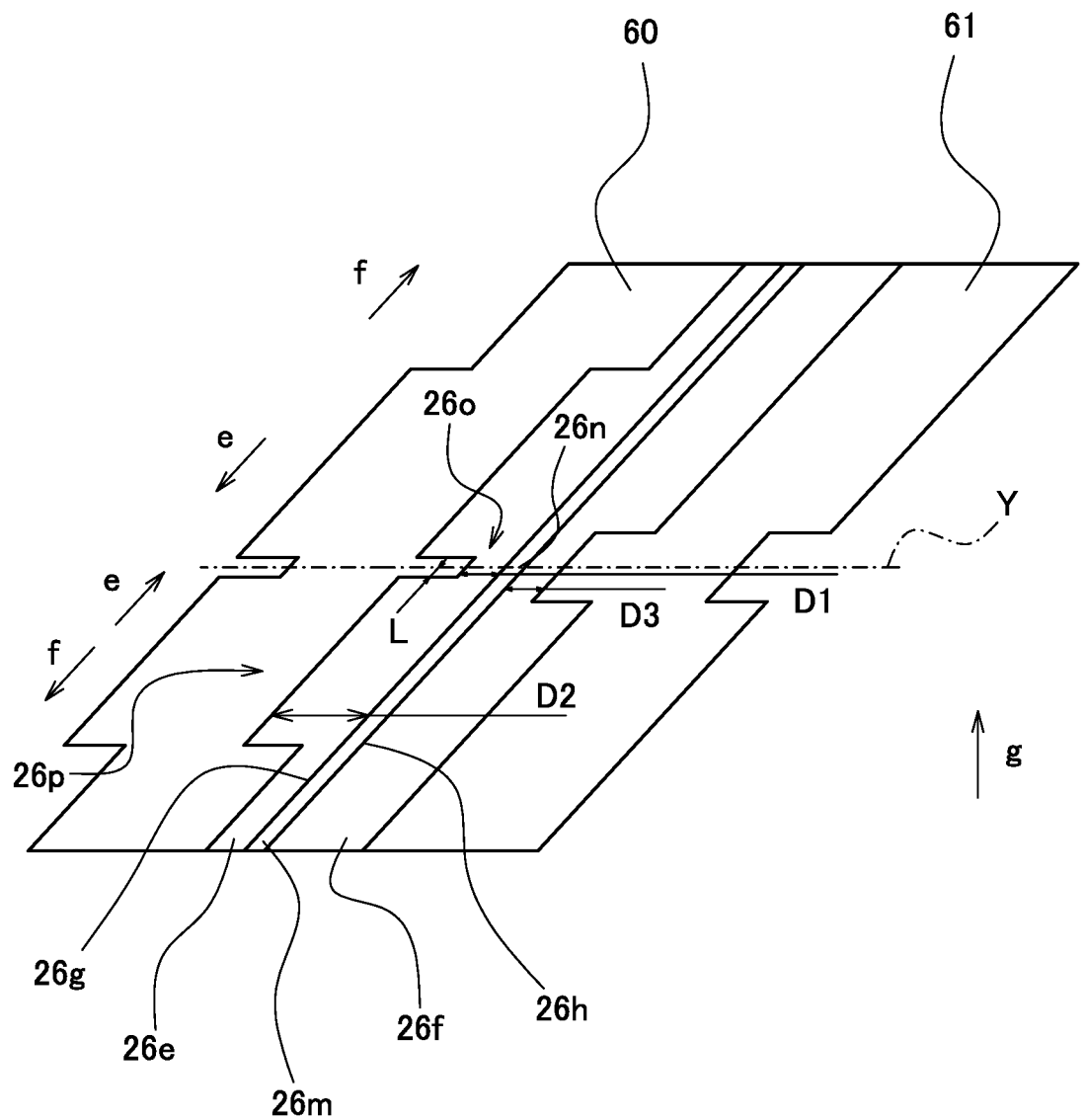
FIG. 4 is a perspective view showing an adjustment step included in a method for manufacturing the alkaline storage battery according to the embodiment.
Figure 5:
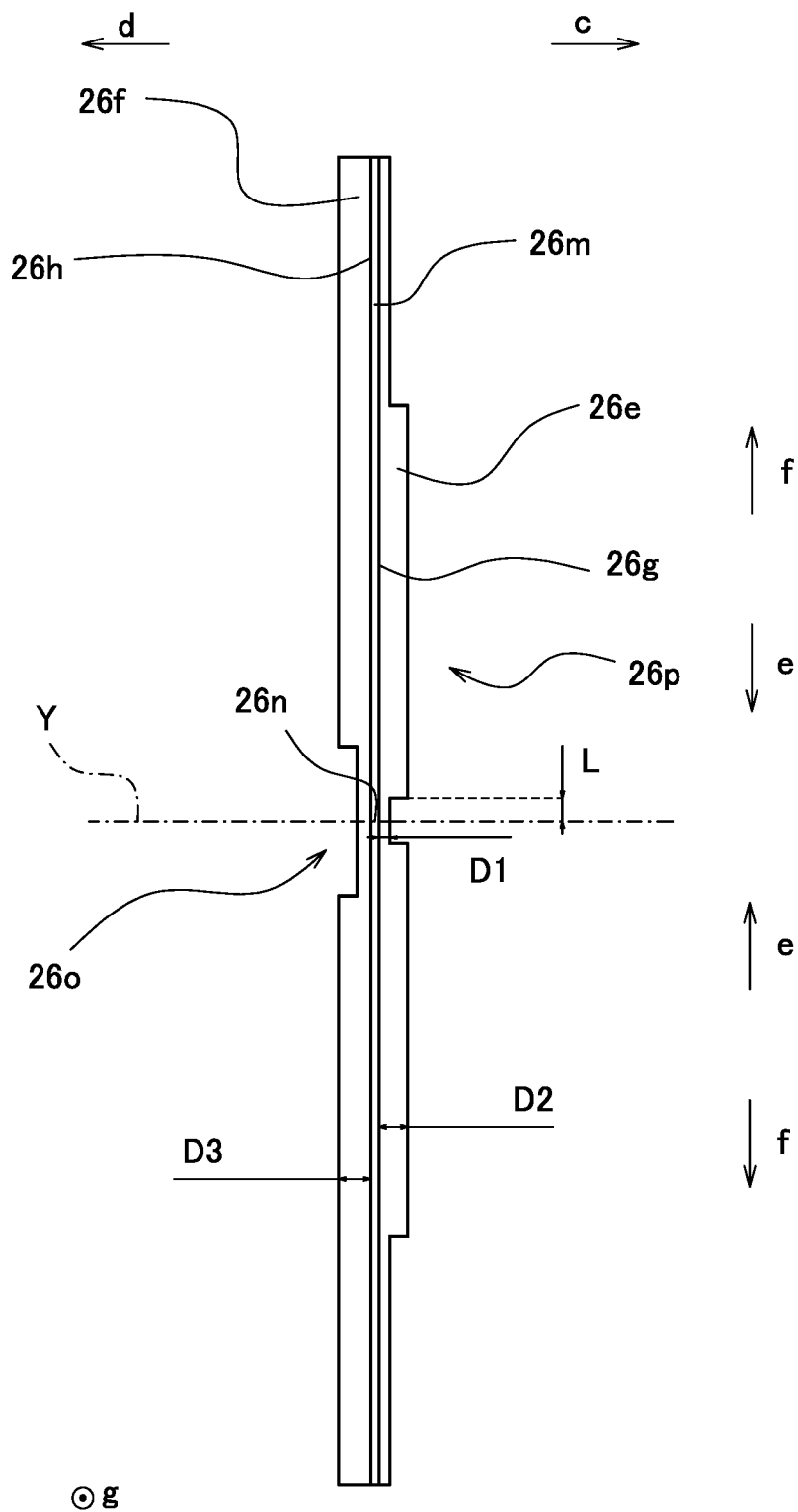
FIG. 5 is an elevational view showing a negative electrode core body base material, a first negative electrode mixture layer, and a second negative electrode mixture layer after the step of FIG. 4.
Figure 6:
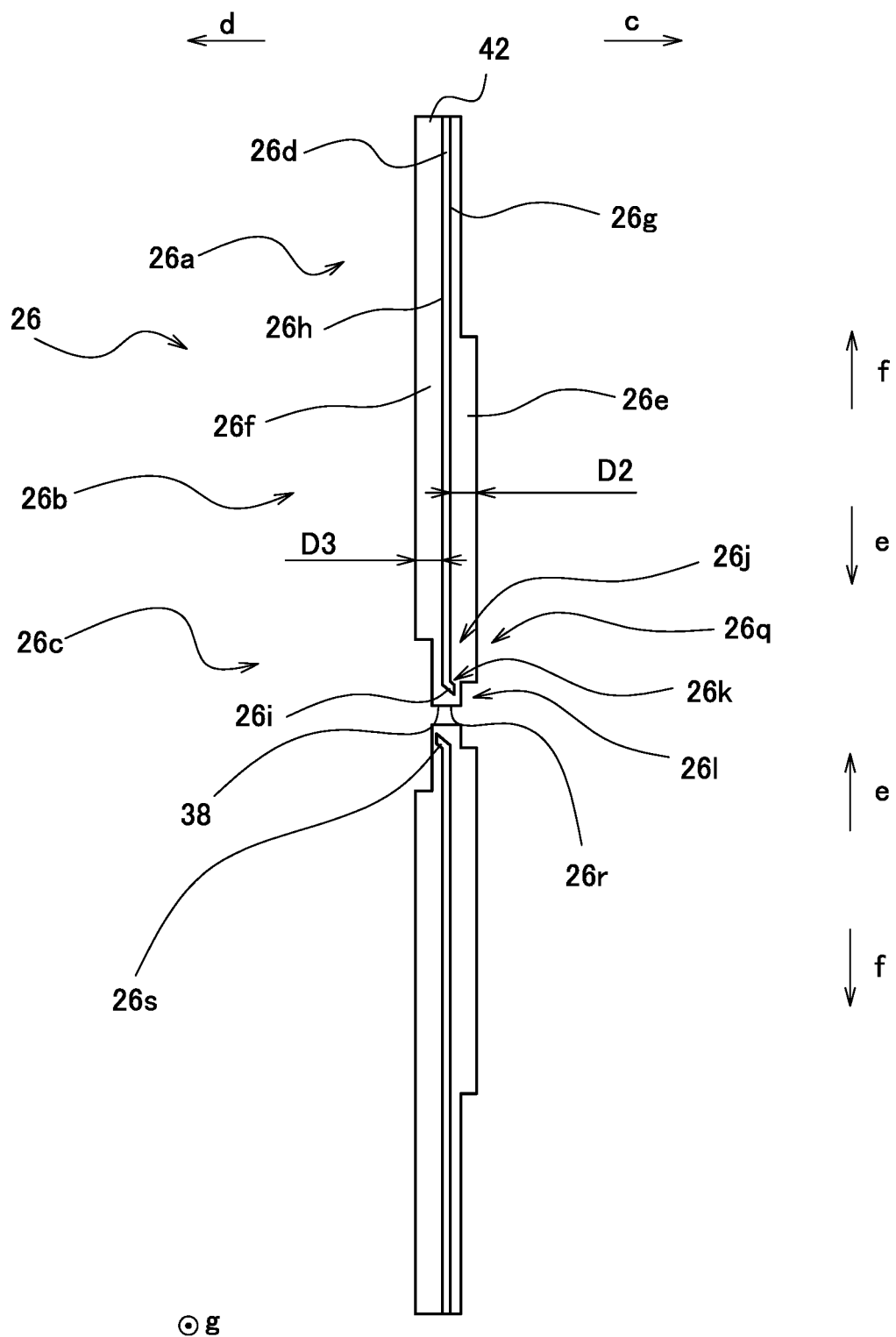
FIG. 6 is an elevational view showing a negative electrode plate after a cutting step included in the method for manufacturing the alkaline storage battery according to the embodiment.

The negative electrode plate 26 can be manufactured, for example, as follows. Here, FIG. 4 is a perspective view showing an adjustment step included in a method for manufacturing the battery 2 according to the embodiment. FIG. 5 is an elevational view showing the negative electrode core body base material 26m, the first negative electrode mixture layer 26e, and the second negative electrode mixture layer 26f after the step (adjustment step) of FIG. 4. FIG. 6 is an elevational view showing the negative electrode plate 26 after the cutting step included in the method for manufacturing the battery 2 according to the embodiment. For convenience of description, in FIG. 4, an upward direction is defined as a longitudinal direction of the negative electrode core body base material 26m (the direction of an arrow g). The longitudinal direction of the negative electrode core body base material 26m is a direction along a traveling direction of the negative electrode core body base material 26m in the manufacturing process of the negative electrode plate 26. Further, in the description of FIGS. 4 and 5, the short direction of the negative electrode core body base material 26m is indicated by an arrow f, which corresponds to the arrow f in FIG. 3. The another short direction of the negative electrode core body base material 26m is indicated by an arrow e, which corresponds to the arrow e in FIG. 3. And a one-dotted chain line Y indicates a cutting position in a cutting step described later. In this embodiment, the short direction means the same direction as the width direction defined by the width of the negative electrode core body base material 26m, which is perpendicular to the longitudinal direction, i.e., the traveling direction. Further, in the description of FIG. 6, the direction of the arrow e is directed to the winding start end 38 of the negative electrode plate 26, and the direction of the arrow f is directed to the winding end 42 of the negative electrode plate 26 as in the description of FIG. 3. Further, the lower side of the negative electrode core body 26d is directed to an outer peripheral side in the state of the spiral electrode group 22 (the direction of the arrow c), and the upper side of the negative electrode core body 26d described later is directed to an inner peripheral side in the state of the spiral electrode group 22 (the direction of the arrow d).

First, hydrogen storage alloy powder which is an aggregate of hydrogen storage alloy particles as described above, a conductive agent, a binder, and water are prepared, and these materials are kneaded to prepare a paste of a negative electrode mixture.

The obtained paste is coated on the negative electrode core body base material 26m in a coating step (not shown). Specifically, in the coating step, the first negative electrode mixture layer 26e is coated on one surface of the belt-shaped negative electrode core body base material 26m, and the second negative electrode mixture layer 26f is coated on the other surface of the negative electrode core body base material 26m. Here, the one surface of the negative electrode core body base material 26m corresponds to the outer peripheral surface 26g of the negative electrode plate 26 in the state of the spiral electrode group 22, and the other surface of the negative electrode core body base material 26m corresponds to the inner peripheral surface 26h of the negative electrode plate 26 in the state of the spiral electrode group 22. In this coating step, the first negative electrode mixture layer 26e and the second negative electrode mixture layer 26f are coated on the negative electrode core body base material 26m at a constant thickness.

After the coating step, the adjustment step shown in FIG. 4 is carried out. In the adjustment step, the first negative electrode mixture layer 26e is adjusted so that the thickness D1 of the first negative electrode mixture layer 26e in a first region 26o containing the center 26n of the negative electrode core body base material 26m is smaller than the thickness D2 of the first negative electrode mixture layer 26e in a second region 26p other than the first region 26o. The center 26n of the negative electrode core body base material 26m means the center in the short direction of the negative electrode core body base material 26m. More specifically, in the adjustment step, the negative electrode core body base material 26m coated with the first negative electrode mixture layer 26e and the second negative electrode mixture layer 26f passes between a first slit 60 and a second slit 61 which have predetermined shapes, whereby the first negative electrode mixture layer 26e and the second negative electrode mixture layer 26f are partially scraped off to adjust the shapes of the first negative electrode mixture layer 26e and the second negative electrode mixture layer 26f. Note that it is preferable to adjust the first negative electrode mixture layer 26e in the adjustment step so that the thickness D1 of the first negative electrode mixture layer 26e in the first region 26o is not more than 0.19 mm, and more specifically, the first negative electrode mixture layer 26e is not less than 0.13 mm and not more than 0.19 mm. Further, it is preferable to adjust the first negative electrode mixture layer 26e in the adjustment step so that the range of the first region 26o is set to cover a distance L of not less than 0.6 mm and not more than 10 mm in each of the directions of the arrows h from the center 26n in the short direction of the negative electrode core body base material 26m. Specifically, the first region 26o is preferably located in a range of not less than 0.6 mm to not more than 10 mm extending from the center 26n of the negative electrode core body base material 26m outwards in the short direction (the direction to the arrow h), and also preferably has a thickness of not less than 0.13 mm and not more than 0.19 mm from one surface of the negative electrode core body base material 26m (corresponding to the outer peripheral surface 26g of the negative electrode plate 26).

The second region 26p is a portion of the first negative electrode mixture layer 26e which is located outside the first region 26o in the short direction, and the shape thereof is not particularly limited. For example, as shown in FIG. 4, the first negative electrode mixture layer 26e in the second region 26p is formed so that an outer portion thereof in the short direction is thinner. However, the shape of the first negative electrode mixture layer 26e in the second region 26p is not limited to this shape, and the first negative electrode mixture layer 26e in the second region 26p may be formed to be uniform in thickness, for example. Further, the shape of the second negative electrode mixture layer 26f is not particularly limited. For example, as shown in FIG. 4, the second negative electrode mixture layer 26f is formed so that only an inner portion thereof in the short direction is thinner. However, the thickness of the second negative electrode mixture layer 26f is not limited to this style, and for example, the second negative electrode mixture layer 26f may be formed to be uniform in thickness.

After the adjustment step, the negative electrode core body base material 26m, the first negative electrode mixture layer 26e and the second negative electrode mixture layer 26f are dried to obtain the first negative electrode mixture layer 26e and the second negative electrode mixture layer 26f which have been shaped as shown in FIG. 5. Thereafter, in the cutting step (not shown), the negative electrode core body base material 26m, the first negative electrode mixture layer 26e, and the second negative electrode mixture layer 26f are cut in the longitudinal direction at the cutting line Y drawn at the center 26n in the short direction of the negative electrode core body base material 26m, and cut in the short direction of the negative electrode core body base material 26m to manufacture the belt-shaped negative electrode plate 26 shown in FIG. 6. In this cutting step, when the negative electrode core body base material 26m, the first negative electrode mixture layer 26e, and the second negative electrode mixture layer 26f are cut in the longitudinal direction by a cutter (not shown), burr 26i protruding toward the outer peripheral side (the direction of the arrow c) is formed as shown in FIG. 6.

Next, the method for manufacturing the battery 2 will be described. In a winding step, the positive electrode plate 24 and the negative electrode plate 26 manufactured as described above are spirally wound with the separator 28 being interposed therebetween. Specifically, after the cutting step, the negative electrode plate 26, the belt-shaped positive electrode plate 24, and the belt-shaped separator 28 placed between the positive electrode plate 24 and the negative electrode plate 26 are laminated, to manufacture the spiral electrode group having a spiral shape so that the negative electrode plate 26 is located on the outer peripheral side of the positive electrode plate 24 at the outermost peripheral portion 50 of the spiral electrode group 22 and the negative electrode plate 26 is located on the inner peripheral side of the positive electrode plate 24 at the innermost peripheral portion 58 of the spiral electrode group 22 (FIG. 2). In the winding step, the spiral electrode group 22 is manufactured so that the first negative electrode mixture layer 26e is located on the outer peripheral side in the negative electrode plate 26, and the center 26n of the negative electrode core body base material 26m cut in the cutting step becomes the edge (winding start end) 38 of the innermost peripheral portion 26c of the negative electrode plate 26. Note that the thickness D1 of the edge portion 26l of the innermost peripheral portion 26q of the first negative electrode mixture layer 26e, the thickness D2 of the portion other than the edge portion 26l of the first negative electrode mixture layer 26e, and the thickness D4 of the separator 28, the height H of the burrs 26i and the distance L from the edge of the innermost peripheral portion 26q of the first negative electrode mixture layer 26e do not change before and after the winding step.

The thus-obtained spiral electrode group 22 is inserted into the outer packaging can 10 in an insertion step, and subsequently, a predetermined amount of alkaline electrolytic solution is injected into the outer packaging can 10.

Specifically, after the winding step, the spiral electrode group 22 is inserted into the electrically conductive cylindrical outer packaging can 10 together with the alkaline electrolytic solution. As a result, the outermost peripheral portion 26a of the negative electrode plate 26 is electrically connected to the outer packaging can 10.

After the insertion step, the positive electrode terminal 20 is electrically connected to the positive electrode plate 24. Specifically, the outer packaging can 10 in which the spiral electrode group 22 and the alkaline electrolytic solution are accommodated is sealed by the sealing body 11 having the positive electrode terminal 20 to obtain the battery 2 according to the present disclosure. The battery 2 is subjected to an initial activation treatment and ready for use.

Next, operations and effects of the battery 2 according to the embodiment of the present disclosure and the method for manufacturing the battery 2 will be described. As described above, according to the battery 2 of the embodiment of the present disclosure, the thickness D1 of the edge portion 26l of the innermost peripheral portion 26q of the first negative electrode mixture layer 26e is smaller than the thickness D2 of the portion other than the edge portion 26l of the first negative electrode mixture layer 26e, and is 30% or less of the thickness D4 of the separator 28. As described above, in the battery 2 according to the present disclosure, the height H of the burr 26i is 30% or less of the thickness D4 of the separator 28 in the state of the spiral electrode group 22. Therefore, even when the inner peripheral side portion of the separator 28, that is, the inner peripheral side portion of the separator 28 facing the burr 26i of the negative electrode core body 26d is broken in the state of the spiral electrode group 22, the burr 26i of the negative electrode core body 26d does not penetrate the separator 28 and reach the positive electrode plate 24. Therefore, it is possible to provide the battery 2 capable of preventing the short circuit between the positive electrode plate 24 and the negative electrode plate 26.

According to the method for manufacturing the battery 2 of the embodiment of the present disclosure, in the adjustment step, the first negative electrode mixture layer 26e is adjusted so that the thickness D1 of the first negative electrode mixture layer 26e in the first region 26o containing the center 26n of the negative electrode core body base material 26m is thinner than the thickness D2 of the first negative electrode mixture layer 26e in the second region 26p other than the first region 26o. Further, in the winding step, the spiral electrode group 22 is manufactured so that the first negative electrode mixture layer 26e is located on the outer peripheral side of the negative electrode plate 26, and the center 26n of the negative electrode core body base material 26m cut in the cutting step becomes the edge (winding start end 38) of the innermost peripheral portion 26c of the negative electrode plate 26. As described above, according to the method for manufacturing the battery 2 of the present disclosure, in the adjustment step, the first negative electrode mixture layer 26e in the first region 26o of the negative electrode core body base material 26m is formed to be smaller in thickness than the thickness D2 of the first negative electrode mixture layer 26e in the second region 26p. Therefore, a time for cutting the center 26n (first region 26o) in the short direction of the negative electrode core body base material 26m in the cutting step is shortened, and the amount of deformation of the negative electrode core body base material 26m in the cutting step can be reduced. As a result, the height H of the burr 26i formed on the negative electrode core body 26d of the negative electrode plate 26 can be made as low as possible, specifically can be set to 30% or less of the thickness D4 of the separator 28. Therefore, even when the inner peripheral side portion of the separator 28, that is, the portion of the negative electrode core body 26d facing the burr 26i is broken in the winding step, the burr 26i formed on the negative electrode core body 26d does not penetrates the separator 28 and reach the positive electrode plate 24. Therefore, it is possible to provide the battery 2 which prevents the short circuit between the positive electrode plate 24 and the negative electrode plate 26.

1. Manufacturing Battery

Example 1

(1) Production of Positive Electrode Plate 24

Nickel hydroxide powder containing zinc of 2.5 mass % and cobalt of 1.0 mass % was put into an aqueous cobalt sulfate solution. Then, a sodium hydroxide aqueous solution of 1 mol/l was gradually dropped to cause a reaction while stirring the cobalt sulfate aqueous solution, and during this reaction, a precipitate was generated while maintaining a pH value at 11. Thereafter, the produced precipitate was filtered off, washed with water, and subjected to vacuum drying to obtain nickel hydroxide powder in which the surface of the nickel hydroxide particles was coated with cobalt hydroxide of 5 mass %.

Further, the thus-obtained nickel hydroxide powder coated with cobalt hydroxide was put into sodium hydroxide aqueous solution of 25 mass %. Here, this treatment was performed so that the mass ratio of these materials was equal to P:Q=1:10, where P represents the mass of the nickel hydroxide powder coated with cobalt hydroxide and Q represents the mass of the aqueous sodium hydroxide solution. The aqueous sodium hydroxide solution to which the nickel hydroxide powder was added was heat-treated while being stirred for 8 hours in a state where the temperature was kept at 85° C.

Thereafter, the nickel hydroxide powder that had been subjected to the above-mentioned heat treatment was washed with water and dried at 65° C. to obtain nickel positive electrode active material powder in which the surfaces of the nickel hydroxide particles were coated with a higher-order cobalt oxide.

Zinc oxide powder of 3 parts by mass, cobalt hydroxide powder of 2 parts by mass, and an aqueous solution of 50 parts by mass containing hydroxypropyl cellulose powder of 0.2 mass % as a binder were added to the obtained nickel positive electrode active material powder of 95 parts by mass, and kneaded to prepare positive electrode mixture slurry.

Next, the positive electrode mixture slurry was filled in a nickel foam having a surface density (weight per unit area) of about 600 g/m$^2$, a porosity of 95%, and a thickness of about 2 mm, dried, rolled while the filling density of the positive electrode active material calculated by: the positive electrode mixture mass [g]÷(electrode height [cm]×electrode length [cm]×electrode thickness [cm]−the mass of nickel foam [g]÷specific gravity of nickel [g/cm$^3$]) was adjusted to be equal to 2.9 g/cm$^3$, and then cut to a predetermined size to obtain a positive electrode plate 24 made of a non-sintered nickel electrode.

(2) Production of Negative Electrode Plate 26

After respective metal material of La, Sm, Mg, Ni, and Al were mixed so as to obtain a mixture having a predetermined molar ratio, the mixture was put into an induction melting furnace, dissolved, and then cooled to prepare an ingot.

Next, the ingot was subjected to a heat treatment of heating in an argon gas atmosphere at a temperature of 1000° C. for 10 hours to homogenize the ingot, and then mechanically pulverized in an argon gas atmosphere to obtain rare earth-Mg—Ni-based hydrogen storage alloy powder. A particle size distribution of the obtained rare earth-Mg—Ni-based hydrogen storage alloy powder was measured by a laser diffraction/scattering type particle size distribution measuring apparatus (machine name: SRA-150 manufactured by Microtrac company). As a result, the average particle size was 35 μm, which corresponds to 50% in integration based on the mass.

When the composition of this hydrogen storage alloy powder was analyzed by a radio frequency plasma spectroscopy (ICP), the composition was La0.30Sm0.70Mg0.11Ni3.33Al0.17. Further, when the hydrogen storage alloy powder was subjected to X-ray diffraction measurement (XRD measurement), the crystal structure was Ce2Ni7 type.

Ketjen black powder of 0.5 parts by mass, styrene butadiene rubber powder of 1.0 part by mass, sodium polyacrylate powder of 0.25 part by mass, carboxy methyl cellulose powder of 0.05 part by mass, and water of 20 parts by mass were added to the obtained hydrogen storage alloy powder of 100 parts by mass, and kneaded in an environment of 25° C. to prepare a negative electrode mixture paste.

This negative electrode mixture paste was coated on a punching metal sheet (negative electrode core body base material 26m) as a negative electrode substrate (coating step). After that, a double-row coating was carried out by using a structural unit (first slit 60, second slit 61) arranged so that a central cutting portion (center 26n) became a winding start side (winding start end 38) during winding (adjustment step). This adjustment step produced a first negative electrode mixture layer 26e in which the thickness D3 (FIG. 3) of the edge portion 26l of the second negative electrode mixture layer 26f on the side (the inner peripheral side) which did not face the positive electrode plate 24 was set to 0.10 mm, the thickness (D1) of the edge portion 26l of the first negative electrode mixture layer 26e on the side (outer peripheral side) which faced the positive electrode plate 24 was set to 0.15 mm, and the distance L from the winding start end 38 of the first negative electrode mixture layer 26e was set to 5.6 mm.

(3) Production of Spiral Electrode Group 22

The obtained positive electrode plate 24 and negative electrode plate 26 were spirally wound with the separator 28 being interposed therebetween to prepare the spiral electrode group 22. The separator 28 used for the production of the spiral electrode group 22 was made of a polypropylene fiber non-woven fabric having a sulfone group, and the thickness thereof was 0.1 mm (the weight per unit area was 53 g/m²).

Example 2

The adjustment step produced a first negative electrode mixture layer 26e in which the thickness (D1) of the edge portion 26l of the first negative electrode mixture layer 26e on the side (the outer peripheral side) facing the positive electrode plate 24 was 0.17 mm. The other conditions were set to the same conditions as the example 1 to produce a spiral electrode group 22.

Example 3

The adjustment step produced a first negative electrode mixture layer 26e in which the thickness (D1) of the edge portion 26l of the first negative electrode mixture layer 26e on the side (the outer peripheral side) facing the positive electrode plate 24 was 0.19 mm. The other conditions were set to the same conditions as the example 1 to produce a spiral electrode group 22.

Comparative Example 1

The adjustment step produced a first negative electrode mixture layer 26e in which the thickness (D1) of the edge portion 26l of the first negative electrode mixture layer 26e on the side (outer peripheral side) facing the positive electrode plate 24 was 0.21 mm. The other conditions were set to the same conditions as the example 1 to produce a spiral electrode group 22.

Comparative Example 2

The adjustment step produced a first negative electrode mixture layer 26e in which the thickness (D1) of the edge portion 26l of the first negative electrode mixture layer 26e on the side (outer peripheral side) facing the positive electrode plate 24 was 0.23 mm. The other conditions were set to the same conditions as the example 1 to produce a spiral electrode group 22.

Comparative Example 3

The adjustment step produced a first negative electrode mixture layer 26e in which the thickness (D1) of the edge portion 26l of the first negative electrode mixture layer 26e on the side (outer peripheral side) facing the positive electrode plate 24 was 0.25 mm. The other conditions were set to the same conditions as the example 1 to produce the spiral electrode group 22.

Comparative Example 4

The adjustment step produced a first negative electrode mixture layer 26e in which the thickness (D1) of the edge portion 26l of the first negative electrode mixture layer 26e on the side (outer peripheral side) facing the positive electrode plate 24 was 0.27 mm. The other conditions were set to the same conditions as the example 1 to produce a spiral electrode group 22.

Comparative Example 5

The adjustment step produced a first negative electrode mixture layer 26e in which the thickness (D1) of the edge portion 26l of the first negative electrode mixture layer 26e on the side (outer peripheral side) facing the positive electrode plate 24 was 0.29 mm. The other conditions were set to the same conditions as the example 1 to produce a spiral electrode group 22.

2. Evaluation of Electrode and Electrode Group

Every ten spiral electrode groups 22 of each of Examples 1 to 3 and Comparative Examples 1 to 5 were disassembled, and the relationship of the number of spiral electrode groups 22 in which the separator 28 was pierced by the burr 26i, the height (H) of the burr 26i of the negative electrode plate 26, and the thickness (D1) of the first negative electrode mixture layer is shown in Table 1. Note that the thickness D1 of the edge portion 26l of the first negative electrode mixture layer 26e on the side (outer peripheral side) facing the positive electrode plate 24, the thickness D3 of the edge portion 26*l* of the second negative electrode mixture layer 26*f* on the side (inner peripheral side) which does not face the positive electrode plate 24, the thickness D4 of the separator 28, and the distance L from the winding start end 38 of the first negative electrode mixture layer 26*e* do not change before and after the spiral electrode group 22 is formed.

TABLE 1

| | THICKNESS D1 OF MIXTURE LAYER [mm] | HEIGHT H OF BURR [mm] | NUMBER OF PIERCED SEPARATORS [NUMBER] |
|---|---|---|---|
| EXAMPLE 1 | 0.150 | 0.007 | 0 |
| EXAMPLE 2 | 0.170 | 0.016 | 0 |
| EXAMPLE 3 | 0.190 | 0.030 | 0 |
| COMPARATIVE EXAMPLE 1 | 0.210 | 0.032 | 1 |
| COMPARATIVE EXAMPLE 2 | 0.230 | 0.034 | 2 |
| COMPARATIVE EXAMPLE 3 | 0.250 | 0.042 | 3 |
| COMPARATIVE EXAMPLE 4 | 0.270 | 0.057 | 5 |
| COMPARATIVE EXAMPLE 5 | 0.290 | 0.065 | 8 |

From Table 1, the correlation can be read between the thickness (D1) of the edge portion 26*l* of the first negative electrode mixture layer 26*e* on the side (outer peripheral side) facing the positive electrode plate 24 and the height (H) of the burr 26*i* of the negative electrode plate 26. Specifically, there is a correlation in which as the thickness (D1) of the first negative electrode mixture layer decreases, the height (H) of the burr 26*i* of the negative electrode plate 26 also decreases. More specifically, when the thickness (D1) of the first negative electrode mixture layer is set to 0.19 or less, the number of pierced separators 28 by the burr 26*i* is equal to 0, so that it can be seen that the short circuit between the positive electrode plate 24 and the negative electrode plate 26 can be prevented. Further, from the correlation between the thickness (D1) of the first negative electrode mixture layer and the height (H) of the burr 26*i* of the negative electrode plate 26, it can be estimated that the height (H) of the burr 26*i* of the negative electrode plate 26 is set to zero by setting the thickness (D1) of the first negative electrode mixture layer to 0.13 mm.

Further, when the negative electrode plate 26 of the disassembled spiral electrode group 22 was observed, the burr 26*i* was formed at a position of 0.6 mm from the winding start end 38 as a base point. Therefore, it is considered that the width (distance L) of the edge portion 26*l* of the first negative electrode mixture layer 26*e* on the side (outer peripheral side) facing the positive electrode plate 24 is required to be at least 0.6 mm or more from the winding start end 38. On the other hand, if the width (distance L) of the edge portion 26*l* of the first negative electrode mixture layer 26*e* is excessively increased, there is a risk that the amount of the first negative electrode mixture layer 26*e* decreases and thus the battery characteristics (charging characteristic and discharging characteristic) deteriorate. Therefore, it is considered that the upper limit of the width (distance L) of the edge portion 26*l* of the first negative electrode mixture layer 26*e* is preferably set to 10 mm.

From the foregoing, it is preferable that the edge portion 26*l* of the first negative electrode mixture layer 26*e* on the side (outer peripheral side) facing the positive electrode plate 24 has a thickness of 0.19 mm or less, more specifically a thickness of not less than 0.13 mm and not more than 0.19 mm in the state before the negative electrode plate 26 has been formed in a spiral shape. Further, it is preferable that the edge portion 26*l* of the first negative electrode mixture layer 26*e* on the side (outer peripheral side) facing the positive electrode plate 24 is located at a distance L of not less than 0.6 mm and not more than 10 mm from the edge 26*r* of the innermost peripheral portion 26*q* of the first negative electrode mixture layer 26*e* in the state before the negative electrode plate 26 has been formed in a spiral shape.

Although a preferred embodiment of the present disclosure has been described above, the present disclosure is not limited to the nickel-metal hydride secondary battery 2 according to the above embodiment, and includes any aspects included in the concept of the present disclosure and the scope of claims, and may selectively combine respective configurations as appropriate. In addition, the shapes, materials, arrangements, sizes, etc. of the respective components in the above embodiment can be appropriately changed depending on the specific embodiment of the present disclosure.

Embodiments of the present disclosure being thus described, it will be obvious that the same may be varied in many ways. Such variations are not to be regarded as a departure from the spirit and scope of the disclosure, and all such modifications as would be obvious to one skilled in the art are intended to be included within the scope of the following claims.

What is claimed is:

1. An alkaline storage battery comprising:
   a spiral electrode group that is spirally formed by laminating a positive electrode plate, a negative electrode plate, and a separator, wherein each of the positive electrode plate, the negative electrode plate, and the separator have a belt shape, wherein the separator is arranged between the positive electrode plate and the negative electrode plate so that the negative electrode plate is located on an inner peripheral side of the positive electrode plate at an innermost peripheral portion of the spiral electrode group; and
   an outer packaging can having electric conductivity in which the spiral electrode group is accommodated together with an alkaline electrolytic solution,
   wherein:
   the negative electrode plate comprises a negative electrode core body having a belt shape, a first negative electrode mixture layer coated on an entire surface of an outer peripheral side of the negative electrode core body, and a second negative electrode mixture layer coated on an entire surface of an inner peripheral side of the negative electrode core body;
   the negative electrode core body has a burr protruding toward an outer peripheral side of the first negative electrode mixture layer from an innermost edge of an innermost peripheral portion of the negative electrode core body;
   a thickness of the first negative electrode mixture layer on an edge portion of the innermost peripheral portion of the first negative electrode core body is smaller than a thickness of a portion other than the edge portion of the first negative electrode mixture layer;
   a height of the burr is 30% or less of a thickness of the separator; and
   a winding start end of the negative electrode plate is flush with a winding start end of the positive electrode plate; and a winding end of the negative electrode plate is flush with a winding end of the positive electrode plate.

2. The alkaline storage battery according to claim 1, wherein the edge portion of the first negative electrode mixture layer of the innermost peripheral portion of the negative electrode core body has a thickness of 0.19 mm or less.

3. The alkaline storage battery according to claim 1, wherein the edge portion of the first negative electrode mixture layer is located in a range of not less than 0.6 mm and not more than 10 mm from the innermost edge of the negative electrode core body.

4. A method for manufacturing an alkaline storage battery, comprising:
- a coating step of coating a first negative electrode mixture layer onto one an entire surface of a negative electrode core body base material having a belt shape extending in a longitudinal direction, and coating a second negative electrode mixture layer onto an opposite entire surface of the negative electrode core body base material;
- an adjustment step of adjusting, after the coating step, the first negative electrode mixture layer so that a thickness of the first negative electrode mixture layer in a first region containing a center of a width of the negative electrode core body base material is smaller than a thickness of the first negative electrode mixture layer in a second region other than the first region, the width being in a direction perpendicular to the longitudinal direction;
- a cutting step of cutting, after the adjustment step, the negative electrode core body base material, the first negative electrode mixture layer, and the second negative electrode mixture layer in the longitudinal direction at the center in the short direction of the negative electrode core body base material, and then cutting the negative electrode core body base material, the first negative electrode mixture layer, and the second negative electrode mixture layer in a short direction perpendicular to the longitudinal direction to produce the a negative electrode plate having a belt shape;
- a winding step of laminating and winding in the short direction, after the cutting step, the negative electrode plate, a belt-shaped positive electrode plate, and a belt-shaped separator arranged between the positive electrode plate and the negative electrode plate to produce a spiral electrode group having a spiral shape so that the negative electrode plate is located on an inner peripheral side of the positive electrode plate at an innermost peripheral portion of the spiral electrode group a winding start end of the negative electrode plate is flush with a winding start end of the positive electrode plate, and that a winding end of the negative electrode plate is flush with a winding end of the positive electrode plate; and
- an insertion step of inserting, after the winding step, the spiral electrode group into an outer packaging can having electrical conductivity together with an alkaline electrolyte solution, wherein:
in the winding step, the spiral electrode group is produced so that the first negative electrode mixture layer is located on an outer peripheral side of the negative electrode plate, and the center of the negative electrode core body base material cut in the cutting step becomes an innermost edge of an innermost peripheral portion of the negative electrode plate.

5. The method according to claim 4, wherein the first negative electrode mixture layer is adjusted in the adjustment step so that the thickness of the first negative electrode mixture layer in the first region is 0.19 mm or less.

6. The method according to claim 4, wherein the first negative electrode mixture layer is adjusted in the adjustment step so that the first region extends in a region not less than 0.6 mm to not more than 10 mm from the center in a width direction of the negative electrode core body base material.

* * * * *